US012341283B2

(12) United States Patent
Hirai

(10) Patent No.: US 12,341,283 B2
(45) Date of Patent: Jun. 24, 2025

(54) CONNECTOR WITH HOUSING HAVING THROUGH HOLES

(71) Applicant: SUMITOMO WIRING SYSTEMS, LTD., Mie (JP)

(72) Inventor: Kentaro Hirai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 341 days.

(21) Appl. No.: 17/798,553

(22) PCT Filed: Feb. 1, 2021

(86) PCT No.: PCT/JP2021/003472
§ 371 (c)(1),
(2) Date: Aug. 9, 2022

(87) PCT Pub. No.: WO2021/166613
PCT Pub. Date: Aug. 26, 2021

(65) Prior Publication Data
US 2023/0052465 A1 Feb. 16, 2023

(30) Foreign Application Priority Data
Feb. 20, 2020 (JP) ................................ 2020-027377

(51) Int. Cl.
*H01R 13/41* (2006.01)
*H01R 12/72* (2011.01)

(52) U.S. Cl.
CPC ........... *H01R 13/41* (2013.01); *H01R 12/724* (2013.01)

(58) Field of Classification Search
CPC .............................. H01R 13/41; H01R 12/724
USPC ...................................................... 439/733.1
See application file for complete search history.

(56) References Cited

U.S. PATENT DOCUMENTS 5,489,221 A 2/1996 Fujiura et al.
5,879,200 A * 3/1999 Sugie .................... H01R 13/41 439/733.1
6,159,047 A * 12/2000 Tanaka .............. H01R 13/4364 439/752

(Continued)

FOREIGN PATENT DOCUMENTS

JP H09-055249 A 2/1997
JP 2000-251993 A 9/2000
JP 2002-015806 A 1/2002

OTHER PUBLICATIONS

International Search Report issued on Apr. 20, 2021 for WO 2021/166613 A1 (5 pages).

*Primary Examiner* — Marcus E Harcum
(74) *Attorney, Agent, or Firm* — Venjuris, P.C.

(57) ABSTRACT

A connector is provided with a housing made of synthetic resin, a plurality of slit-like through holes formed in the housing, and a plurality of terminal fittings mounted in the housing while being passed through the through holes. The plurality of through holes are so disposed in parallel that long sides of the through holes are parallel. Projection-like supporting portions configured to come into contact with an outer surface of the terminal fitting to sandwich the terminal fitting are formed on an inner surface of the through hole. The supporting portions are disposed only on two long-side inner wall surfaces, out of the inner surface of the through hole, and project only from parts of the long-side inner wall surfaces in a penetration direction of the through hole.

5 Claims, 6 Drawing Sheets

(56) References Cited

U.S. PATENT DOCUMENTS

| | | | | |
|---|---|---|---|---|
| 6,719,573 | B2 * | 4/2004 | Koehler | H01R 43/20 439/744 |
| 7,175,480 | B2 * | 2/2007 | Yamashita | H01R 13/41 439/869 |
| 7,645,172 | B2 * | 1/2010 | Imai | H01R 13/04 439/733.1 |
| 7,708,605 | B2 * | 5/2010 | Shibata | H01R 13/41 439/869 |
| 7,722,413 | B2 * | 5/2010 | Tonosaki | H01R 13/41 439/82 |
| 7,828,608 | B2 * | 11/2010 | Aihara | H01R 13/41 439/752 |
| 8,210,856 | B2 * | 7/2012 | Suzuki | H01R 12/585 439/78 |
| 9,225,104 | B2 * | 12/2015 | Suzuki | H01R 13/5208 |
| 10,727,623 | B2 * | 7/2020 | Beck | H01R 13/5216 |
| 2004/0097139 | A1 * | 5/2004 | Takada | H01R 12/727 439/733.1 |
| 2006/0068647 | A1 * | 3/2006 | Kojima | H01R 13/4362 439/752 |
| 2009/0029574 | A1 * | 1/2009 | Nakano | H01R 12/707 439/83 |
| 2009/0156048 | A1 | 6/2009 | Homme | |
| 2009/0239414 | A1 | 9/2009 | Hiramatsu | |
| 2015/0031250 | A1 * | 1/2015 | Kitajima | H01R 13/4362 439/733.1 |
| 2015/0064987 | A1 * | 3/2015 | Nakamura | H01R 13/58 439/733.1 |
| 2015/0229059 | A1 * | 8/2015 | Itou | H01R 11/283 439/733.1 |
| 2015/0340816 | A1 * | 11/2015 | Abe | H01R 13/42 439/607.34 |
| 2018/0248291 | A1 * | 8/2018 | Kitajima | H01R 13/41 |

* cited by examiner

CONNECTOR WITH HOUSING HAVING THROUGH HOLES

CROSS REFERENCE TO RELATED APPLICATIONS

This application is a national phase of PCT application No. PCT/JP2021/003472, filed on 1 Feb. 2021, which claims priority from Japanese patent application No. 2020-027377, filed on 20 Feb. 2020, all of which are incorporated herein by reference.

TECHNICAL FIELD

The present disclosure relates to a connector.

BACKGROUND

Patent Document 1 discloses a structure in which a connector is formed with a plurality of pin insertion holes and pins are inserted into the pin insertion holes. The pin includes a plurality of bulges. The pin inserted into the pin insertion hole is retained and held by the bulges biting into an inner wall part of the pin insertion hole.

PRIOR ART DOCUMENT

Patent Document

Patent Document 1: JP 2000-251993 A

SUMMARY OF THE INVENTION

Problems to be Solved

Since being made of synthetic resin, the connector may be deformed to curve in a molding step. In this case, since the orientations of the plurality of pin insertion holes are individually inclined at different angles depending on the positions of the respective pin insertion holes, the plurality of pins inserted into the pin insertion holes are not aligned in parallel with each other.

A connector of the present disclosure was completed on the basis of the above situation and aims to enable a plurality of terminal fittings to be aligned and mounted in parallel even if a housing is deformed.

Means to Solve the Problem

The present disclosure is directed to a connector with a housing made of synthetic resin, a plurality of through holes formed to penetrate through the housing in a front-rear direction, openings of the through holes in a front view having a slit-like shape, and a plurality of terminal fittings mounted in the housing while being passed through the through holes, wherein the plurality of through holes are so disposed in parallel that long sides of the through holes are parallel, projection-like supporting portions configured to come into contact with an outer surface of the terminal fitting to sandwich the terminal fitting are formed on an inner surface of the through hole, the supporting portions are disposed only on two long-side inner wall surfaces along the long sides, out of the inner surface of the through hole, and project only from parts of the long-side inner wall surfaces in a penetration direction of the through hole, and a facing distance between regions of the two long-side inner wall surfaces other than the supporting portions is larger than a thickness of the terminal fitting.

Effect of the Invention

According to the present disclosure, a plurality of terminal fittings can be aligned and mounted in parallel even if a housing is deformed.

DETAILED DESCRIPTION TO EXECUTE THE INVENTION

Description of Embodiments of Present Disclosure

Figure 1:
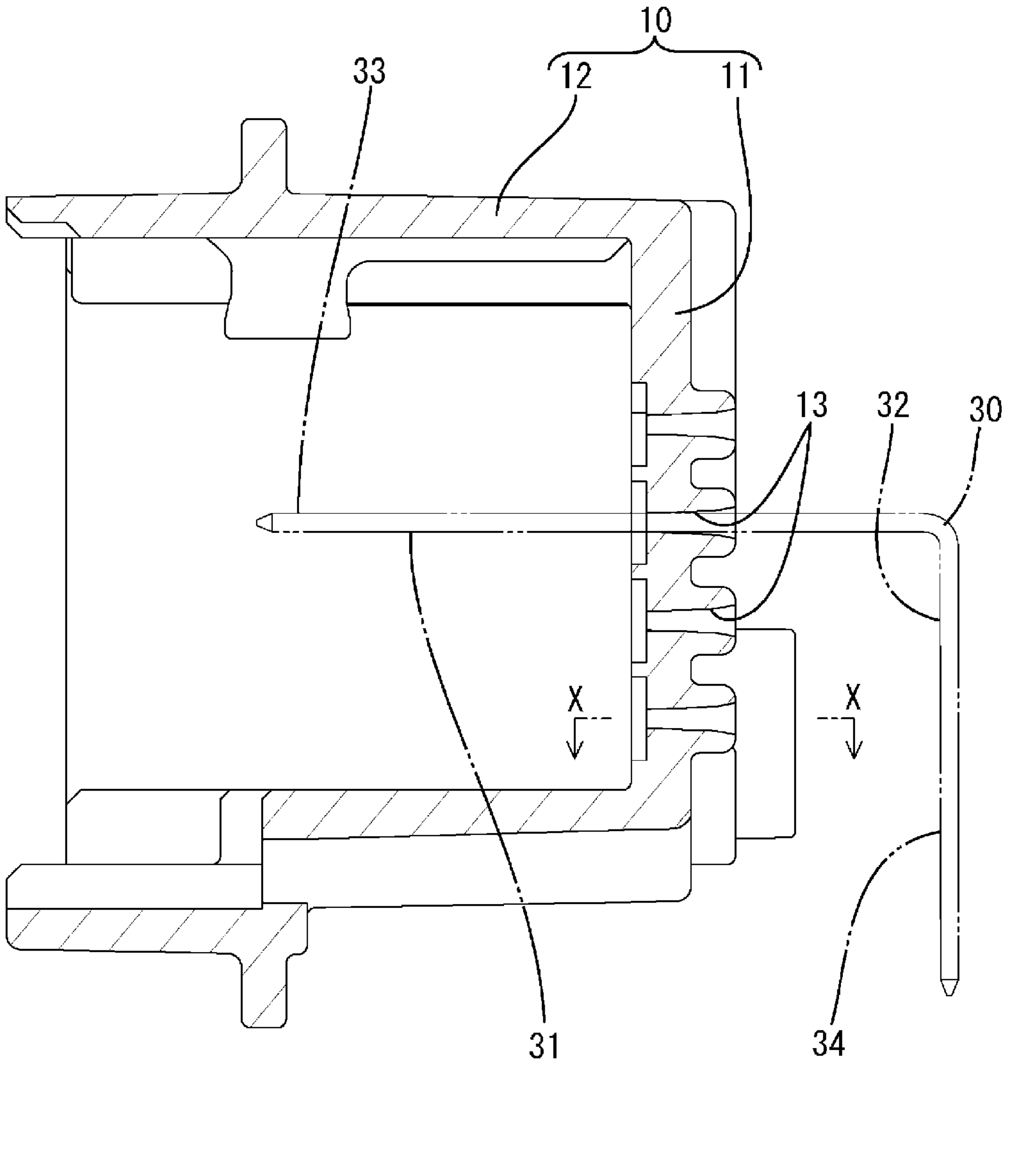
FIG. 1 is a side view in section of a connector.

First, embodiments of the present disclosure are listed and described.

(1) The connector of the present disclosure is provided with a housing made of synthetic resin, a plurality of through holes formed to penetrate through the housing in a front-rear direction, openings of the through holes in a front view having a slit-like shape, and a plurality of terminal fittings mounted in the housing while being passed through the through holes, wherein the plurality of through holes are so disposed in parallel that long sides of the through holes are parallel, projection-like supporting portions configured to come into contact with an outer surface of the terminal fitting to sandwich the terminal fitting are formed on an inner surface of the through hole, the supporting portions are disposed only on two long-side inner wall surfaces along the long sides, out of the inner surface of the through hole, and project only from parts of the long-side inner wall surfaces in a penetration direction of the through hole, and a facing distance between regions of the two long-side inner wall surfaces other than the supporting portions is larger than a thickness of the terminal fitting. In the present disclosure, the supporting portions for sandwiching and supporting the terminal fitting are formed on the two long-side inner wall surfaces of the through hole and the facing distance between the regions of the two long-side inner wall surfaces other than the supporting portions is larger than the thickness of the terminal fitting. According to this configuration, a mounting direction of the terminal fitting into the through hole can be set within the range of a predetermined angle with the supporting portions as supporting points. Therefore, even if the housing is curved, the plurality of terminal fittings can be aligned and mounted in parallel to each other.

(2) Preferably, the terminal fitting includes a contact portion projecting forward from the housing, and the supporting portions are disposed only in a front part of the through hole. According to this configuration, a distance between the contact portion and the supporting portions is short as compared to the case where the supporting portions are disposed only in a rear end part of the through hole. Thus, the position of the contact portion can be stabilized.

(3) Preferably, the supporting portions are disposed only on both end parts in a long side direction of the long-side inner wall surfaces. According to this configuration, a contact area of the supporting portions and the terminal fitting when the terminal fitting is inserted into the through hole is small as compared to the case where the supporting portions are formed over the entire regions in the long side direction of the long-side inner wall surfaces. Thus, insertion resistance is reduced.

(4) Preferably, a facing distance between the two long-side inner wall surfaces in regions behind the supporting portions gradually increases toward a rear side. According to this configuration, even if the terminal fitting is shifted in position in a vertical direction in inserting the terminal fitting into the through hole from behind the housing, the terminal fitting can be guided to the supporting portions.

(5) Preferably, a receiving surface capable of being brought into surface contact with the terminal fitting is formed in a region of the long-side inner wall surface behind the supporting portion. If a contact area of the long-side inner wall surface with the terminal fitting is small when the terminal fitting is mounted while being held in contact with the long-side inner wall surface, there is a concern that a contact part of the long-side inner wall surface with the terminal fitting is deformed. Since the receiving surface serving as the contact part of the long-side inner wall surface with the terminal fitting is brought into surface contact with the terminal fitting in the present disclosure, the deformation of the long-side inner wall surface can be prevented.

(6) Preferably, in (5), a guiding surface having an angle of inclination with respect to the penetration direction of the through hole larger than that of the receiving surface is formed in a region of the long-side inner wall surface behind the receiving surface. According to this configuration, when the terminal fitting is inserted into the through hole from behind, the damage of the receiving surfaces by the terminal fitting can be prevented.

Details of Embodiment of Present Disclosure

Embodiment

Figure 5:
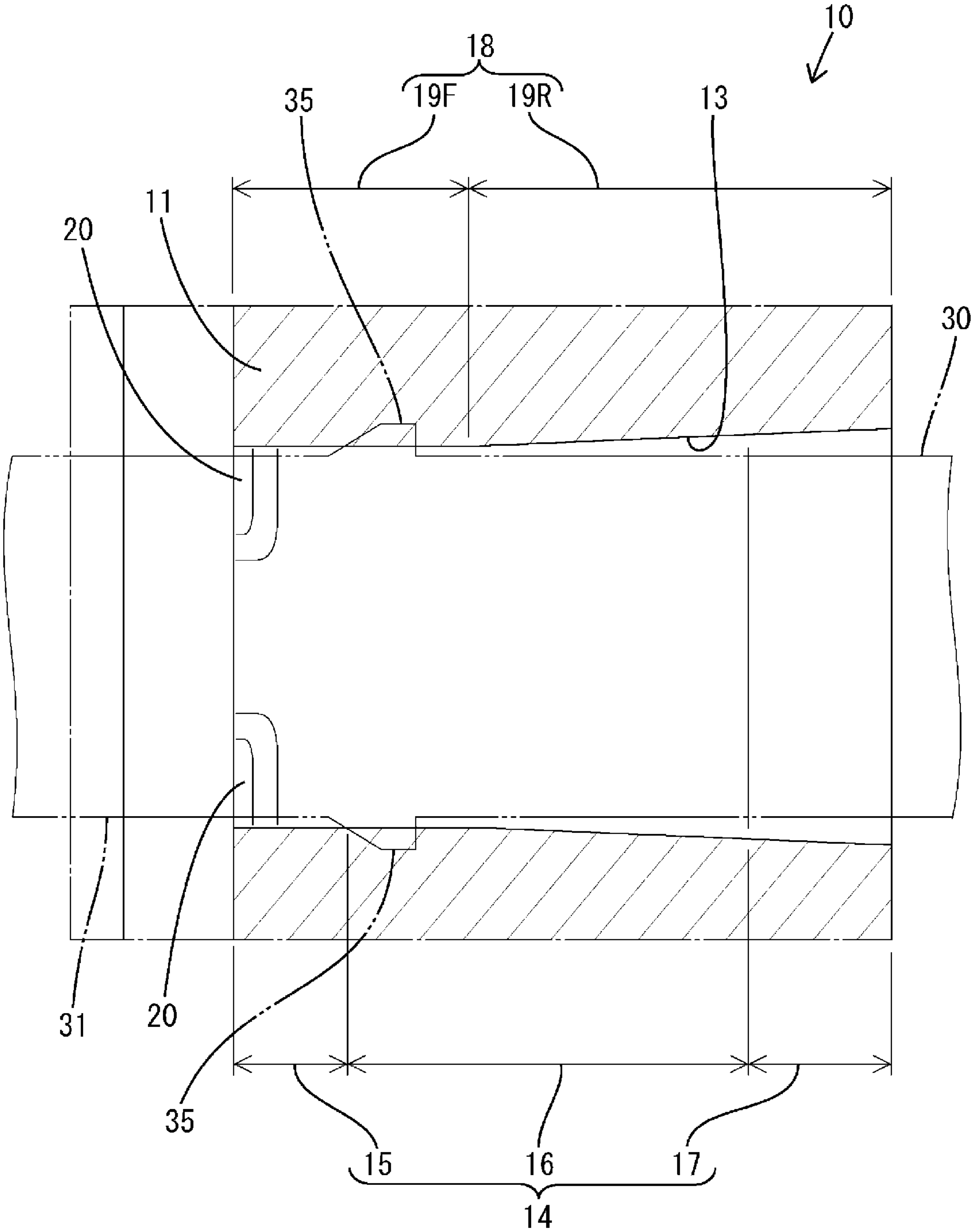
FIG. 5 is a partial enlarged plan view in section along X-X of FIG. 1.
Figure 6:
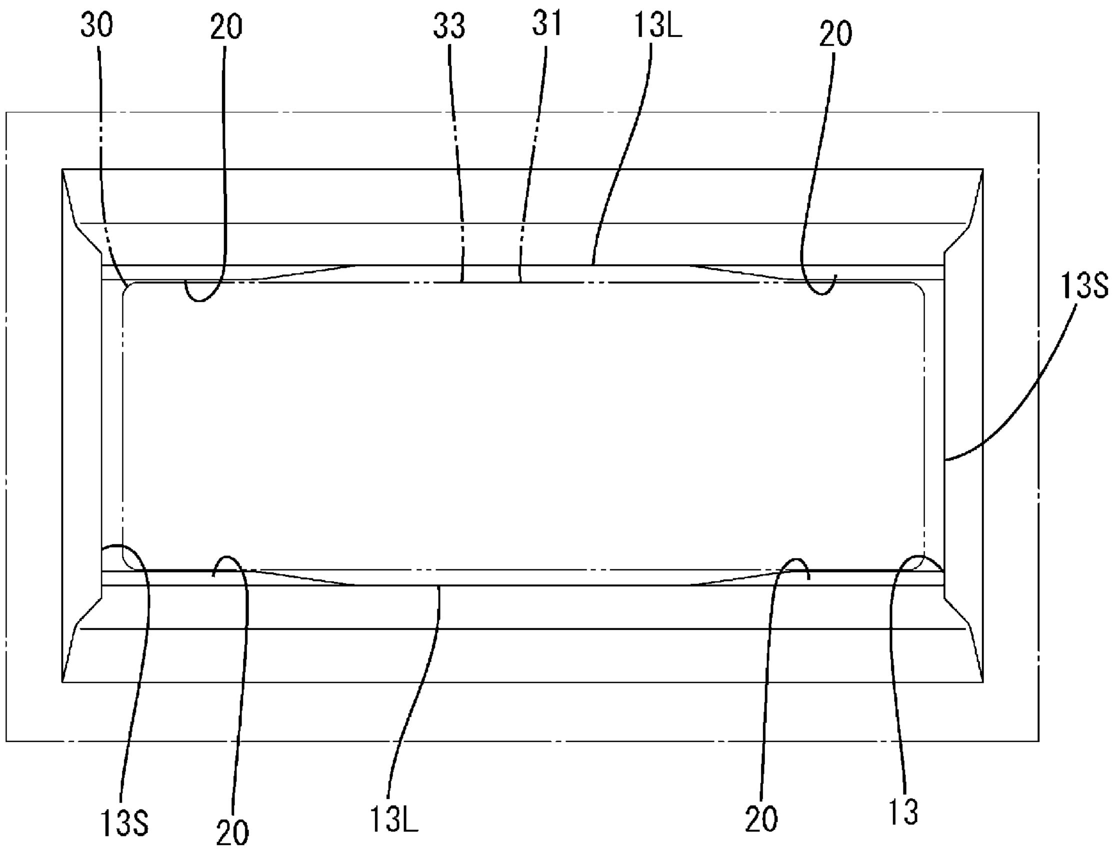
FIG. 6 is an enlarged back view of the through hole.

One specific embodiment of a connector of the present disclosure is described below with reference to FIGS. 1 to 6. Note that the present invention is not limited to these illustrations and is intended to be represented by claims and include all changes in the scope of claims and in the meaning and scope of equivalents. In this embodiment, a left side in FIGS. 1 and 3 to 5 is defined as a front side concerning a front-rear direction. Upper and lower sides shown in FIGS. 1 to 4 and 6 are directly defined as upper and lower sides concerning a vertical direction. Left and right sides shown in FIGS. 2 and 6 are directly defined as left and right sides concerning a lateral direction.

A connector of this embodiment functions as a board connector to be mounted on an unillustrated circuit board. The connector is configured by mounting a plurality of terminal fittings 30 into one housing 10 made of a synthetic resin material. The terminal fitting 30 is formed by being bent an elongated metal plate material at a right angle.

Figure 2:
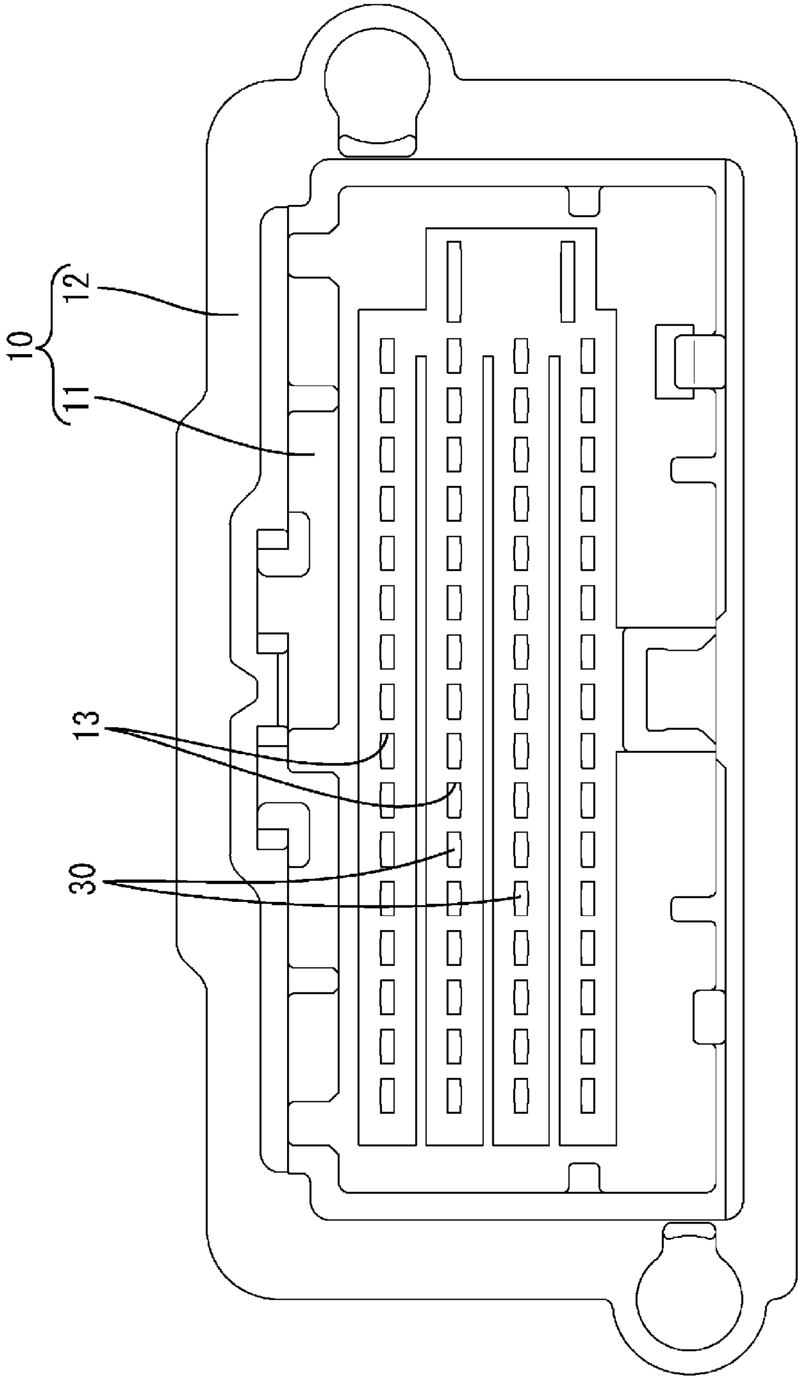
FIG. 2 is a front view of the connector.

As shown in FIG. 1, the terminal fitting 30 includes an arm portion 31 extending straight in the front-rear direction and a leg portion 32 extending straight downward from the rear end of the arm portion 31. A vertical thickness of the arm portion 31 is smaller than a lateral width of the arm portion 31. A front end part of the arm portion 31 functions as a connecting portion 33 to be connected to an unillustrated mating terminal. As shown in FIG. 5, a pair of biting projections 35 are formed at positions behind the connecting portion 33 on both left and right side edge parts of the arm portion 31. A lower end part of the leg portion 32 functions as a board mounting portion 34 to be connected to the circuit board (see FIG. 1).

The housing 10 is a single component including a wall-like terminal holding portion 11 having a thickness direction oriented in the front-rear direction and a receptacle 12 in the form of a rectangular tube projecting forward from the outer peripheral edge of the terminal holding portion 11. The terminal holding portion 11 is formed with a plurality of through holes 13 penetrating through the terminal holding portion 11 in the front-rear direction. In this embodiment, the front-rear direction and a penetration direction of the through holes 13 are used as synonyms. As shown in FIG. 6, in a front view of the terminal holding portion 11 (housing 10), an opening of each through hole 13 in the front surface of the terminal holding portion 11 is in the shape of a slit elongated in the lateral direction. That is, the opening of the through hole 13 in the front surface of the terminal holding portion 11 has a rectangular shape having two long sides 13L extending in the lateral direction and two short sides 13S extending in the vertical direction.

The inner surface of the through hole 13 is composed of a pair of vertically symmetrical long-side inner wall surfaces 14 and a pair of bilaterally symmetrical short-side inner wall surfaces 18. A width of the long-side inner wall surface 14 is larger than a height of the short-side inner wall surface 18. The plurality of through holes 13 are arrayed at certain intervals in the vertical direction and arrayed at certain intervals also in the lateral direction. A plurality of the through holes 13 arranged in the vertical direction are so arranged that the long sides 13L are parallel to each other.

Figure 3:
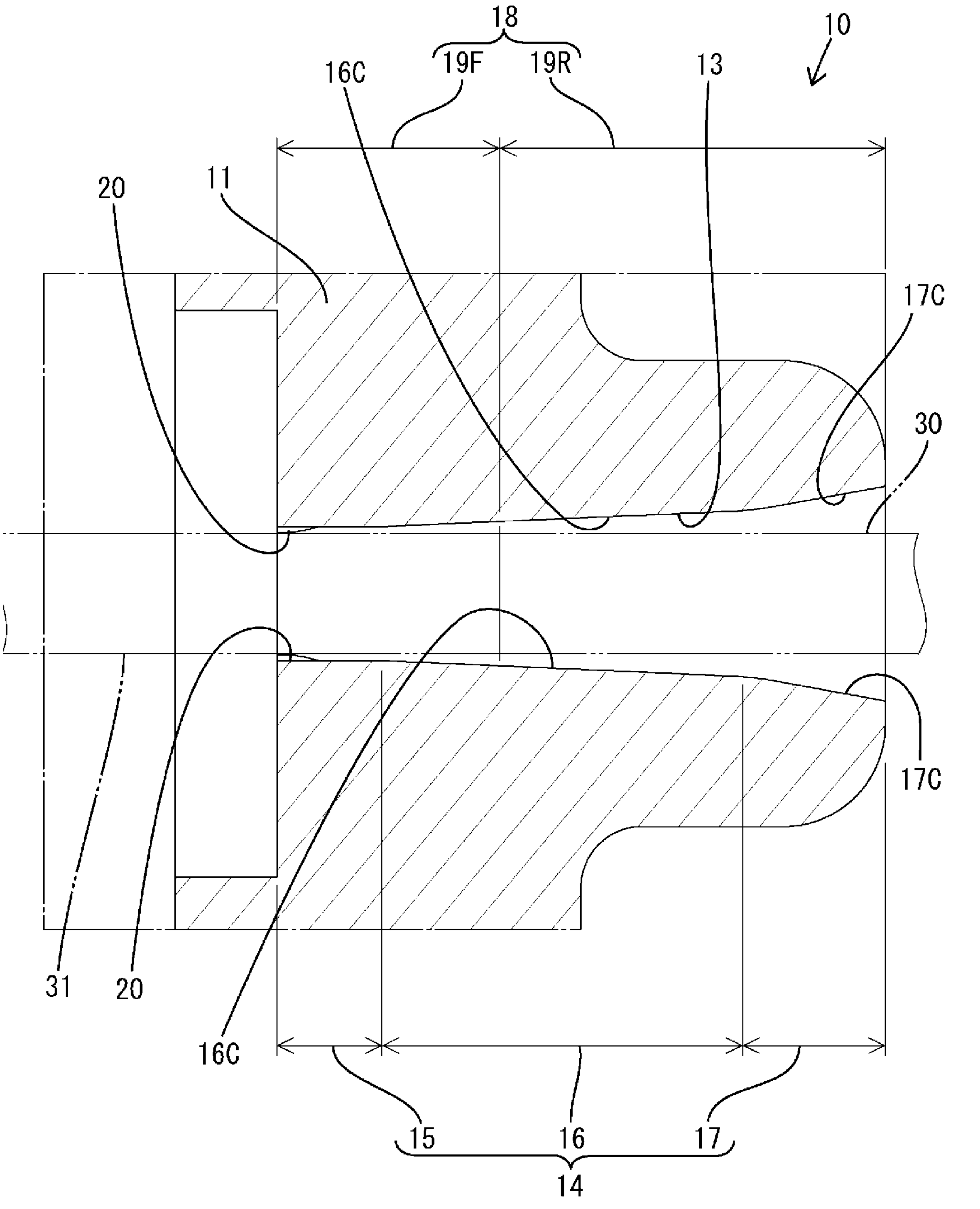
FIG. 3 is a partial enlarged side view in section showing a state where a terminal fitting is mounted in parallel to a penetration direction of a through hole.
Figure 4:
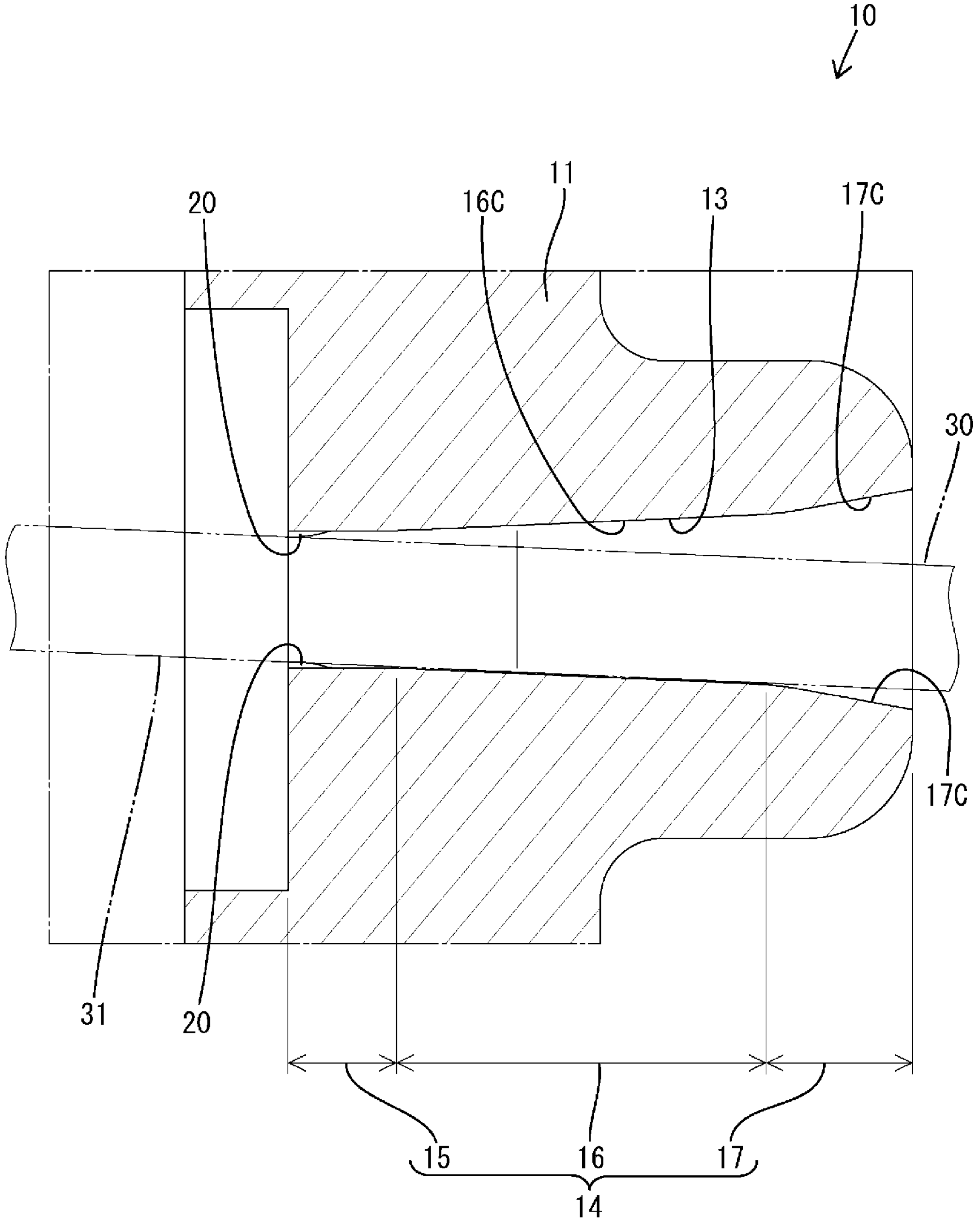
FIG. 4 is a partial enlarged side view in section showing a state where the terminal fitting is mounted obliquely to the penetration direction of the through hole.

As shown in FIGS. 3 and 4, the long-side inner wall surface 14 is composed of a parallel surface 15 parallel to the penetration direction of the through hole 13, a receiving surface 16 constituted by a flat surface inclined with respect to the parallel surface 15 and a guiding surface 17 inclined with respect to the parallel surface 15. The parallel surface 15 is disposed in a front end part of the through hole 13. A vertical distance between the upper parallel surface 15 and the lower parallel surface 15 is larger than a thickness of the arm portion 31 of the terminal fitting 30. The receiving surface 16 is connected at an obtuse angle to the rear end of the parallel surface 15.

A facing distance between the upper receiving surface 16 and the lower receiving surface 16 is smallest at the front ends of the receiving surfaces 16 and gradually increases toward a rear side. The guiding surface 17 is disposed in a rear end part of the through hole 13 and connected at an obtuse angle to the rear end of the guiding surface 17. A facing distance between the upper guiding surface 17 and the lower guiding surface 17 is smallest at the front ends of the guiding surfaces 17 and gradually increases toward the rear side. An angle of inclination of the guiding surface 17 with respect to the parallel surface 15 is larger than that of the receiving surface 16 with respect to the parallel surface 15.

As shown in FIG. 5, the short-side inner wall surface 18 is composed of a front inner side surface 19F constituting a front end side region of the short-side inner wall surface 18 and a rear inner side surface 19R constituting a rear end side region of the short-side inner wall surface 18. The front inner side surface 19F is a flat surface parallel to the penetration direction of the through hole 13. A lateral distance between the both left and right front inner side surfaces 19F is slightly larger than the width of the arm portion 31 of the terminal fitting 30. The rear end of the front inner side surface 19F is located behind the front end of the receiving surface 16 and in front of the rear end of the receiving surface 16. The rear inner side surface 19R is constituted by a flat surface inclined with respect to the front inner side surface 19F and connected at an obtuse angle to the rear end of the front inner side surface 19F. A facing distance between the left rear inner side surface 19R and the right rear inner side surface 19R is shortest at the front ends of the rear inner side surfaces 19R and gradually increases toward the rear side.

Four supporting portions 20 are formed on the inner surface of the through hole 13. Two supporting portions 20 projecting downward are disposed on both left and right end parts of the upper long-side inner wall surface 14 while being spaced apart in the lateral direction. Two supporting portions 20 projecting upward are disposed on both left and right end parts of the lower long-side inner wall surface 14 while being spaced apart in the lateral direction. A distance between two supporting portions 20 facing each other in the vertical direction is set equal to or slightly larger than the thickness of the arm portion 31 of the terminal fitting 20. Note that a projecting dimension of the supporting portion 20 from the parallel surface 15 is shown in an exaggerated manner to facilitate understanding of the description in FIGS. 3, 4 and 6.

In mounting the terminal fitting 30 into the housing 10, the arm portion 31 of the terminal fitting 30 is inserted into the through hole 13 from behind the housing 10. With the arm portion 31 inserted, the pair of left and right biting projections 35 bite into the front inner side surfaces 19F. By this biting action, the terminal fitting 30 is held with relative displacements in the front-rear direction with respect to the terminal holding portion 11 restricted.

A facing distance between the two long-side inner wall surfaces 14 in a region of the through hole 13 behind the supporting portions 20 gradually increases toward the rear side. In inserting the terminal fitting 30 into the through hole 13 from behind the housing 10, the terminal fitting 30 can be guided to the supporting portions 20 even if the terminal fitting 30 is shifted in position in the vertical direction. That is, the pair of guiding surfaces 17 vertically inclined with respect to the front-rear direction are formed in the rear end part of the through hole 13, and the receiving surfaces 16 inclined with respect to the front-rear direction are also formed in front of the guiding surfaces 17. Thus, even if the position of the front end part of the arm portion 31 is vertically shifted during insertion, the arm portion 31 is guided to the parallel surface 15 by the inclination of the guiding surface 17 and the inclination of the receiving surface 16. Further, since the pair of left and right rear inner side surfaces 19R laterally inclined with respect to the front-rear direction are formed in the rear end part of the through hole 13, the arm portion 31 is guided to the front inner side surface 19F by the inclination of the rear inner side surface 19R even if the position of the front end part of the arm portion 31 is laterally shifted during insertion.

If the terminal holding portion 11 is neither curved nor deformed, the penetration directions of the plurality of through holes 13 (i.e. the orientations of the parallel surfaces 15) arranged in the vertical direction are all aligned with the front-rear direction. In this case, both upper and lower surfaces of the arm portions 31 and the parallel surfaces 15 are oriented in parallel while being vertically spaced apart and facing each other since the arm portions 31 of all the terminal fittings 30 are inserted in parallel to the penetration directions of the through holes 13 as shown.

If the arm portion 31 is mounted in parallel to the penetration direction of the through hole 13 as shown in FIG. 3, a receiving surface side clearance 16C between the upper receiving surface 16 and the upper surface of the arm portion 31 and a receiving surface side clearance 16C between the lower receiving surface 16 and the lower surface of the arm portion 31 are vertically symmetrical. Vertical dimensions of the receiving surface side clearances 16C are smallest at the front ends of the receiving surfaces 16 (i.e. end parts near the supporting portions 20 in the front-rear direction) and largest at the rear ends of the receiving surfaces 16 (i.e. end parts distant from the supporting portions 20 in the front-rear direction).

A guiding surface side clearance 17C between the upper guiding surface 17 and the upper surface of the arm portion 31 and a guiding surface side clearance 17C between the lower guiding surface 17 and the lower surface of the arm portion 31 are also vertically symmetrical. Vertical dimensions of the guiding surface side clearances 17C are smallest at the front ends of the guiding surfaces 17 (i.e. end parts near the supporting portions 20 in the front-rear direction) and largest at the rear ends of the guiding surfaces 17 (i.e. end parts distant from the supporting portions 20 in the front-rear direction).

The housing 10 may be deformed in a molding process since being molded by filling a molten resin into a mold (not shown). If the terminal holding portion 11 is deformed to curve in a side view of the housing 10 viewed laterally in parallel to the long sides 13L of the through holes 13, the penetration directions of the plurality of through holes 13 (i.e. the orientations of the parallel surfaces 15) arranged in the vertical direction are subtly different. Thus, the penetration direction of at least one through hole 13 is slightly oblique to the front-rear direction. Also in this case, all the arm portions 31 are passed through the through holes 13 in parallel to the front-rear direction for all the through holes 13. Since all the connecting portions 33 are aligned in parallel with each other in a side view in this way, all the connecting portions 33 can be smoothly connected to a plurality of the mating terminals (not shown).

In the through hole 13 having the penetration direction oblique to the front-rear direction, the arm portion 31 is mounted obliquely with respect to the penetration direction of the through hole 13 and the parallel surfaces 15 as shown in FIG. 4. Since the supporting portions 20 projecting from the parallel surfaces 15 support the arm portion 31 in the front end part of this through hole 13, the arm portion 31 does not interfere with the parallel surfaces 15. Further, since the projecting ends of the supporting portions 20 are located on forward extensions of the receiving surfaces 16 in the side view, the arm portion 31 is in surface contact with the entire region of the receiving surface 16 when the arm portion 31 is most inclined with respect to the through hole 13. Since the angle of inclination of the guiding surface 17 with respect to the front-rear direction is larger than that of the receiving surface 16 with respect to the front-rear direction, the arm portion 31 does not interfere with the guiding surface 17 while being held in surface contact with the receiving surface 16.

The connector of this embodiment includes the housing 10 made of synthetic resin and the plurality of terminal fittings 30. The housing 10 is formed with the plurality of through holes 13 penetrating through the terminal holding portion 11 in the front-rear direction. The opening of the through hole 13 in a front view is in the shape of a slit long in the lateral direction. The plurality of through holes 13 are so disposed in parallel that the long sides 13L of the through holes 13 are parallel. The plurality of terminal fittings 30 are mounted in the housing 10 while being individually passed through the plurality of through holes 13.

The supporting portions 20 in the form of projections configured to come into contact with the outer surface of the terminal fitting 30 to vertically sandwich the terminal fitting 30 are formed on the inner surface of the through hole 13. The supporting portions 20 are disposed only on the two upper and lower long-side inner wall surfaces 14 along the long sides 13L, out of the inner surface of the through hole 13. The four supporting portions 20 project only from parts of the long-side inner wall surfaces 14 in the penetration direction of the through hole 13.

Two pairs of the supporting portions 20 for sandwiching and supporting the terminal fitting 30 are formed on the two long-side inner wall surfaces 14. The supporting portions 20 for vertically sandwiching the terminal fitting 30 are paired. The facing distance between regions of the two long-side inner wall surfaces 14 other than the supporting portions 20 in the penetration direction of the through hole 13 (entire regions behind the supporting portions 20) is larger than the thickness of the terminal fitting 30. According to this configuration, a mounting direction of the terminal fitting 30 into the through hole 13 can be set within the range of a predetermined angle with the supporting portions 20 as supporting points. Therefore, even if the housing 10 is curved, the plurality of terminal fittings 30 can be aligned and mounted in parallel to each other.

The terminal fitting 30 includes the connecting portion 30 projecting forward from the terminal holding portion 11 of the housing 10 while being mounted in the housing 10. The supporting portions 20 are disposed only in the front end part of the through hole 13. According to this configuration, since a distance in the front-rear direction between the connecting portion 33 and the supporting portions 20 is short as compared to the case where the supporting portions 20 are disposed only in the rear end part of the through hole 13, the position of the connecting portion 33 can be stabilized.

If the supporting portions 20 are formed over the entire regions of the long-side inner wall surfaces 14 in a direction of the long sides 13L unlike this embodiment, insertion resistance is large since a contact area of the supporting portions 20 and the terminal fitting 30 when the terminal fitting 30 is inserted into the through hole 13 is large. In contrast, in this embodiment, the supporting portions 20 are disposed only on the both end parts of the long-side inner wall surfaces 14 in the direction of the long sides 13L (lateral direction). In this way, the contact area of the supporting portions 20 and the terminal fitting 30 when the terminal fitting 30 is inserted into the through hole 13 becomes smaller, wherefore the insertion resistance is reduced.

The receiving surface 16 capable of being brought into surface contact with the terminal fitting 30 is formed in the region of the long-side inner wall surface 14 behind the supporting portions 20. If a contact area of the long-side inner wall surface 14 with the terminal fitting 30 is small when the terminal fitting 30 is mounted while being held in contact with the long-side inner wall surface 14, there is a concern that a connected part of the long-side inner wall surface 14 with the terminal fitting 30 is deformed. Since the receiving surface 16 serving as the connected part of the long-side inner wall surface 14 with the terminal fitting 30 comes into surface contact with the terminal fitting 30, the deformation of the long-side inner wall surface 14 can be prevented.

The guiding surface 17 having the angle of inclination with respect to the penetration direction of the through hole 13 larger than that of the receiving surface 16 is formed in the region of the long-side inner wall surface 14 behind the receiving surface 16. According to this configuration, when the terminal fitting 30 is inserted into the through hole 13 from behind, the damage of the receiving surface 16 by the terminal fitting 30 can be prevented.

Other Embodiments

The present invention is not limited to the above described and illustrated embodiment and is represented by claims. The present invention is intended to include all changes in the scope of claims and in the meaning and scope of equivalents and also include the following embodiments.

Although the supporting portions are disposed only in the front end part of the through hole in the above embodiment, the supporting portions may be disposed only in the rear end part of the through hole or only in a central part in the front-rear direction of the through hole.

Although the supporting portions are disposed only on the both end parts in the long-side direction of the long-side inner wall surfaces in the above embodiment, the supporting portions may be disposed only in central parts in the long-side direction of the long-side inner wall surfaces or may be continuously provided on the entire regions in the long-side direction of the long-side inner wall surfaces.

Although the supporting portions are disposed only in the front end part in the penetration direction of the through hole in the above embodiment, the supporting portions may be disposed only in the rear end part in the penetration direction of the through hole or may be disposed only in a central part in the penetration direction of the through hole.

Although the terminal fitting and the long-side inner wall surface come into surface contact when the terminal fitting is inclined in the above embodiment, the terminal fitting may come into contact with a projection-like part on the long-side inner wall surfaces when being inclined.

Although the guiding surface is formed in the region of the long-side inner wall surface behind the receiving surface in the above embodiment, the receiving surface may be formed up to the rear end of the through hole without forming such a guiding surface.

LIST OF REFERENCE NUMERALS

10 . . . housing
11 . . . terminal holding portion
12 . . . receptacle
13 . . . through hole
13L . . . long side
13S . . . short side
14 . . . long-side inner wall surface
15 . . . parallel surface
16 . . . receiving surface
16C . . . receiving surface side clearance
17 . . . guiding surface
17C . . . guiding surface side clearance
18 . . . short-side inner wall surface
19F . . . front inner side surface
19R . . . rear inner side surface
20 . . . supporting portion
30 . . . terminal fitting
31 . . . arm portion
32 . . . leg portion
33 . . . connecting portion

34 . . . board mounting portion
35 . . . biting projection

What is claimed is:

1. A connector, comprising:

a housing made of synthetic resin;

a plurality of through holes formed to penetrate through the housing in a front-rear direction, openings of the through holes in a front view having a slit-like shape; and a plurality of terminal fittings mounted in the housing while being passed through the through holes, wherein:

the plurality of through holes are so disposed in parallel that long sides of the through holes are parallel, projection-like supporting portions configured to come into contact with an outer surface of the terminal fitting to sandwich the terminal fitting are formed on an inner surface of the through hole, the supporting portions are disposed only on two long-side inner wall surfaces along the long sides, out of the inner surface of the through hole, and project only from parts of the long-side inner wall surfaces in a penetration direction of the through hole, a facing distance between regions of the two long-side inner wall surfaces other than the supporting portions is larger than a thickness of the terminal fitting, the terminal fitting includes a contact portion projecting forward from the housing, and the supporting portions are disposed only in a front part of the through hole.

2. The connector of claim 1, wherein the supporting portions are disposed only on both end parts in a long side direction of the long-side inner wall surfaces.

3. The connector of claim 1, wherein a facing distance between the two long-side inner wall surfaces in regions behind the supporting portions gradually increases toward a rear side.

4. The connector of claim 1, wherein a receiving surface capable of being brought into surface contact with the terminal fitting is formed in a region of the long-side inner wall surface behind the supporting portion.

5. The connector of claim 4, wherein a guiding surface having an angle of inclination with respect to the penetration direction of the through hole larger than that of the receiving surface is formed in a region of the long-side inner wall surface behind the receiving surface.

* * * * *